(12) United States Patent
Carr et al.

(10) Patent No.: US 10,826,977 B2
(45) Date of Patent: Nov. 3, 2020

(54) SYSTEM AND METHOD FOR SUPPORTING ASYNCHRONOUS REQUEST/RESPONSE IN A NETWORK ENVIRONMENT

(71) Applicant: Oracle International Corporation, Redwood Shores, CA (US)

(72) Inventors: Harold Carr, Salt Lake City, UT (US); Prashant Agarwal, Sunnyvale, CA (US); Shing Wai Chan, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 958 days.

(21) Appl. No.: 14/864,621

(22) Filed: Sep. 24, 2015

(65) Prior Publication Data

US 2016/0094636 A1   Mar. 31, 2016

Related U.S. Application Data

(60) Provisional application No. 62/055,492, filed on Sep. 25, 2014.

(51) Int. Cl.
*G06F 15/16* (2006.01)
*H04L 29/08* (2006.01)

(52) U.S. Cl.
CPC .......... *H04L 67/1002* (2013.01); *H04L 67/02* (2013.01)

(58) Field of Classification Search
CPC ........ G06F 9/50; H04L 67/02; H04L 67/1002
See application file for complete search history.

(56) References Cited

U.S. PATENT DOCUMENTS

| | | | |
|---|---|---|---|
| 2005/0120160 A1* | 6/2005 | Plouffe | G06F 9/45537 711/1 |
| 2011/0246640 A1* | 10/2011 | Saha | G06F 11/3476 709/224 |
| 2015/0026108 A1* | 1/2015 | Portegys | G06F 9/5083 706/21 |
| 2015/0341428 A1* | 11/2015 | Chauhan | H04L 69/16 709/203 |

* cited by examiner

*Primary Examiner* — Normin Abedin
(74) *Attorney, Agent, or Firm* — Tucker Ellis LLP

(57) ABSTRACT

A system and method can support asynchronous request/response in a network environment. A network protocol can utilize a load balancer to balance requests, such as HTTP requests, over a fast network interface, such as InfiniBand, to one or more nodes of an application server cluster. The system and method can attach headers to the requests such that the requests can be sent in an interleaved manner. The system and method can further allow for sending of large requests by breaking up the large requests into smaller portions, and sending each portion, interleaved, with other requests.

20 Claims, 4 Drawing Sheets

SYSTEM AND METHOD FOR SUPPORTING ASYNCHRONOUS REQUEST/RESPONSE IN A NETWORK ENVIRONMENT

CLAIM OF PRIORITY

This application claims the benefit of priority to U.S. Provisional Application titled "SYSTEM AND METHOD FOR SUPPORTING ASYNCHRONOUS REQUEST/RESPONSE IN A NETWORK ENVIRONMENT", Application No. 62/055,492, filed Sep. 25, 2014, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.'

FIELD OF INVENTION

The present invention is generally related to computer systems, and is particularly related to supporting messaging in a network environment.

SUMMARY

A system and method can support asynchronous request/response in a network environment. A network protocol can utilize a load balancer to balance requests, such as HTTP requests, over a fast network interface, such as InfiniBand, to one or more nodes of an application server cluster. The system and method can attach headers to the requests such that the requests can be sent in an interleaved manner. The system and method can further allow for sending of large requests by breaking up the large requests into smaller portions, and sending each portion, interleaved, with other requests.

DETAILED DESCRIPTION

Figure 1:
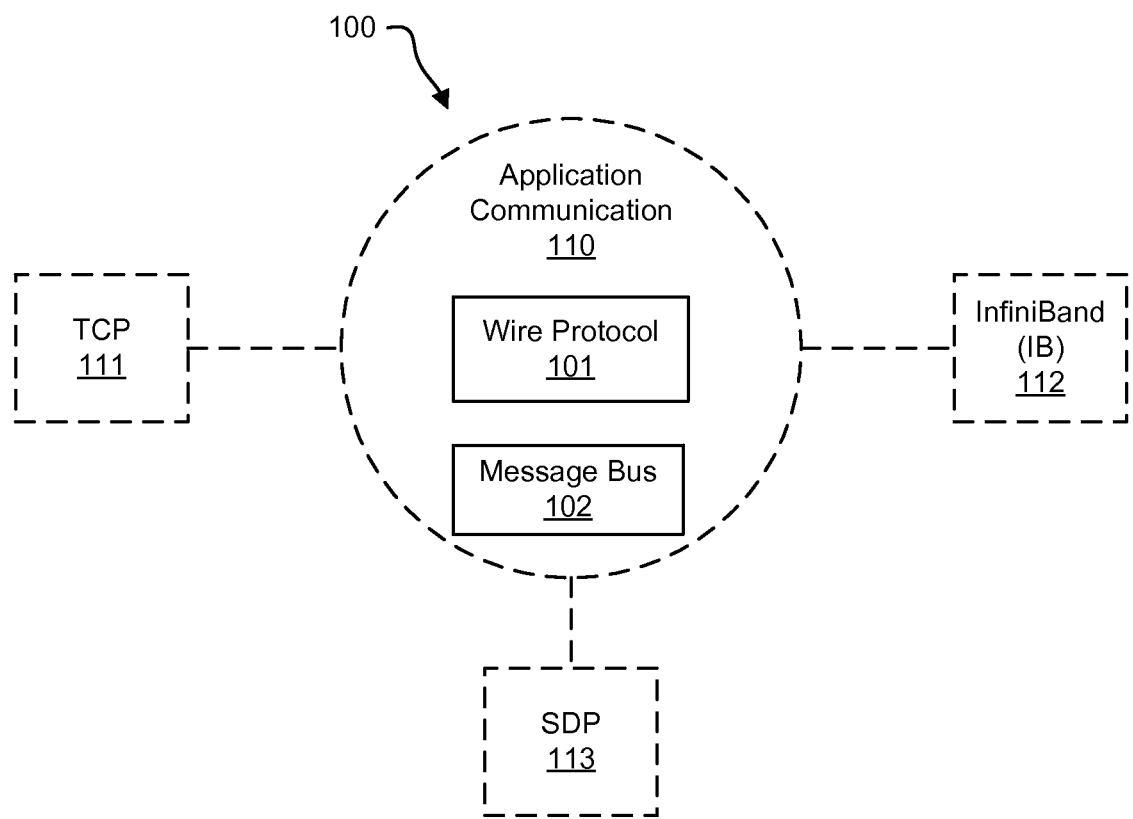
FIG. 1 shows an illustration of supporting messaging in a network environment, in accordance with an embodiment of the invention.

Described herein are systems and methods that can support messaging, such as asynchronous request/response, in a network environment.

The invention is illustrated, by way of example and not by way of limitation, in the figures of the accompanying drawings in which like references can indicate similar elements. It should be noted that references to "an" or "one" or "some" embodiment(s) in this disclosure are not necessarily to the same embodiment, and such references mean at least one.

The description of the invention as following uses a WebLogic application server environment as an example for a middleware environment. It will be apparent to those skilled in the art that other types of middleware environments can be used without limitation.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or WebLogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, a middleware system, such as a WebLogic application system, can take advantage of fast machines with multiple processors, such as an Exalogic middleware machine, and a high performance network connection, such as an InfiniBand (IB) network.

Asynchronous Request/Response

FIG. 1 shows an illustration of supporting messaging in a network environment, in accordance with an embodiment of the invention. As shown in FIG. 1, application communication 110 in a network environment 100 can be based on a wire protocol 101, such as an asynchronous request/response wire protocol, and a messaging bus (MB) 102.

For example, a modern data center can support the application communication 110 between large numbers of nodes in clusters. The application communication 110 can take advantage of the high-bandwidth, low-latency and high-scalability, which are supported by the underlying network communication link technologies, such as the InfiniBand (IB) 112 technologies.

In accordance with an embodiment of the invention, the messaging bus 102 can be used to support the application communication 110 using different transport protocols, such as the transmission control protocol (TCP) 111, the Infini-Band (IB) protocol 112, and the sockets direct protocol (SDP) 113.

For example, the Oracle MessageBus (MB) Java API allows different applications to easily exchange data between computers, e.g. in the form of Java ByteBuffers. Using the MB Java API, the applications can take advantage of the IB protocols (without interacting directly with the IB hardware or low-level C-language drivers). Also, the MB Java API can use TCP 111 for transmitting the Java Byte-Buffers between computers, when the IB protocol is unavailable.

In accordance with an embodiment of the invention, the messaging bus 102 can be augmented with a wire protocol 101, such as an asynchronous request/response wire protocol (e.g. Oracle Buzz wire protocol), to act as a transport for various request/response protocols for supporting the application communication 110.

For example, the Oracle Buzz wire protocol is a layer on top of the MB Java API. The Oracle Buzz wire protocol can provide the request/response semantics for using the MB Java API with various request/response protocols (such as HTTP, IIOP and T3). Additionally, the Oracle Buzz wire protocol can provide the ability for sending the messages in fragments and can correlate different responses and fragments.

In accordance with an embodiment of the invention, the combination of the asynchronous request/response wire protocol 101 and the messaging bus 102 (e.g. the Buzz/MB APIs) can be used for supporting communication between applications. The system allows the applications in a network environment 100 to garner the benefits of the IB protocols 112 when the IB protocols 112 are available, while maintaining the TCP 111 functionalities when the IB protocols 112 is not available.

For example, if an application is deployed on an ExaLogic machine, the application can automatically use the IB protocols 112 for transmitting messages. On the other hand, if an application is deployed on a non-ExaLogic machines, the system, which is based on the messaging bus, may fall back to using TCP 111.

Furthermore, the combination of the asynchronous request/response wire protocol 101 and the messaging bus 102 (e.g. the Buzz/MB APIs) can make it easier for other components in the network environment 100 (i.e. other parts of the stack) to take advantage of the IB protocols 112.

For example, using the Buzz/MB APIs, a load-balancer (e.g., OTD) can move (i.e. load-balance) the tasks for handling HTTP requests from nodes in an IB network to nodes in a WebLogic (WLS) cluster in a TCP network. Also, using the Buzz/MB APIs, the WLS cluster nodes in a TCP network can communicate between themselves over a T3 network for cluster replication and migration.

In accordance with an embodiment, the asynchronous request response protocol (e.g., Buzz protocol) can issue message identifiers (IDs), which can be scoped by the initiator.

Furthermore, the combination of the asynchronous request/response wire protocol 101 and the messaging bus 102 (e.g. the Buzz/MB APIs) can be used as the foundation for other additional features.

For example, the system can use the Buzz/MB APIs for supporting prescheduling in OTD. Also, the system can direct the OTD to dump potential denial-of-service (DNS) message data in flash storage, while only sending headers with a pointer to the storage. Thus, if the message is determine to be a DNS attack, the user can flush the storage and avoid clogging up the internal network with large messages.

Figure 2:
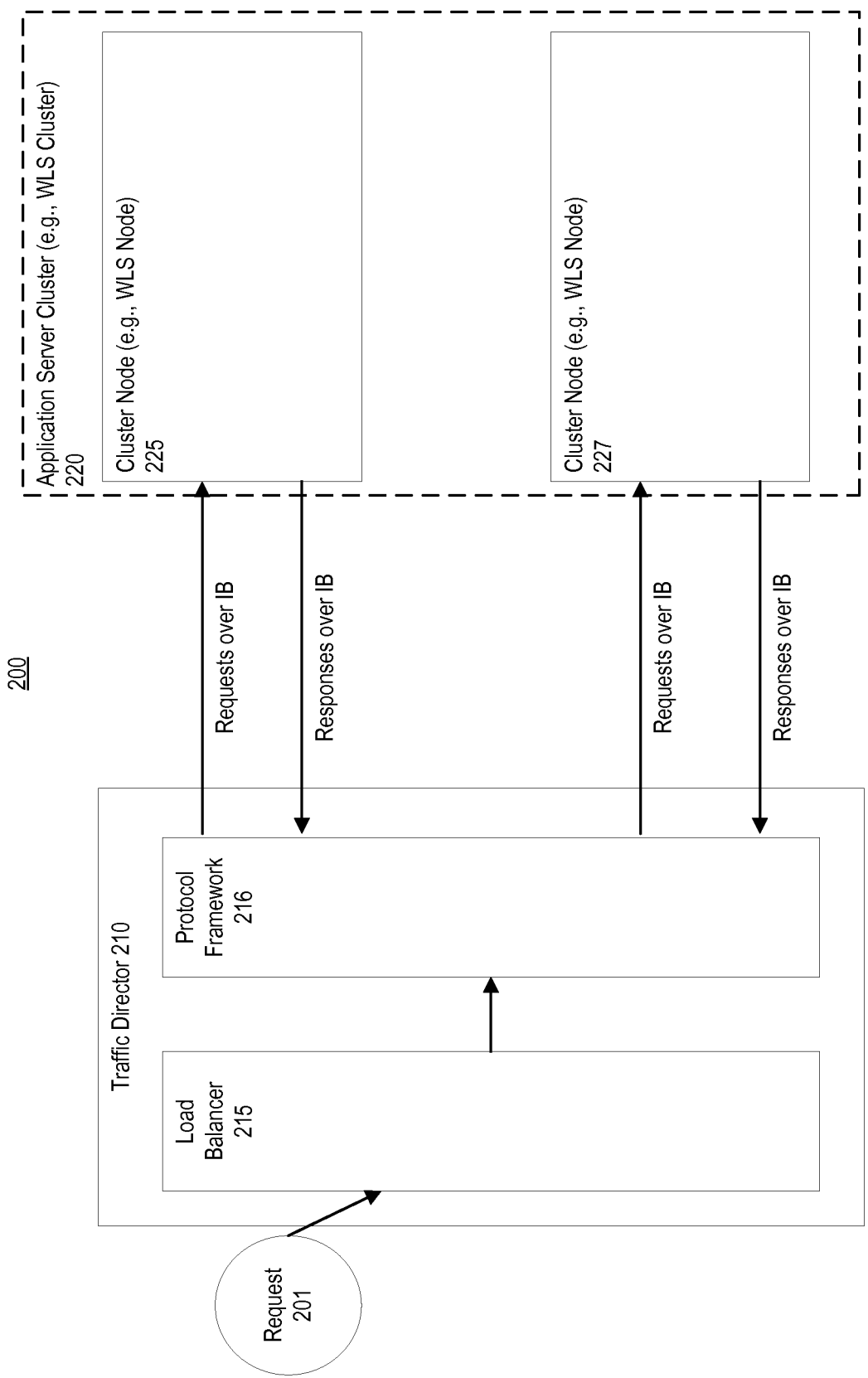
FIG. 2 shows an illustration of supporting asynchronous request response in a network environment, in accordance with an embodiment of the invention.

FIG. 2 shows an illustration of supporting asynchronous request response in a network environment, in accordance with an embodiment of the invention.

As shown in FIG. 2, a network environment 200 can include a traffic director (e.g., Oracle Traffic Director) 210, as well as an application server cluster (e.g., WebLogic Cluster) 220. The traffic director can include a load balancer 215, as well as a protocol framework 216, such as a Buzz protocol framework. The application server cluster can include a plurality of nodes, such as cluster node 225 and cluster node 227, both of which can be, in an embodiment, a node in a WebLogic Server cluster.

In accordance with an embodiment, a request 201, such as an HTTP request, can be received at the traffic director in the network environment. The traffic director can load balance the request before passing the request to protocol framework. The load balancer, which can be part of the traffic director, can distribute workloads across multiple computing resources, such as cluster nodes 225 and 227. An aim of load balancing is to optimize resource use, maximize throughput, minimize response time, and avoid overload of any single resource. Once the requests have been load balanced (e.g., directed to cluster node 225 or cluster node 227), the requests are passed through the protocol framework. Once at the protocol framework, depending on where the load balancer directed the request, the protocol framework can allow for asynchronous requests and responses, over, for example, InfiniBand, to the plurality of nodes within the application server cluster.

In accordance with an embodiment, an asynchronous request response differs from a synchronous request response in a number of ways. When a request invokes a synchronous service, such as request response, an invoking client usually waits for the response to return before it can continue with its work. In this manner, a block is generally placed on a working thread, e.g., the thread that initiated the request to a target, and the block is held (i.e., disallowing other work to be performed on the thread) until a response is received. Because request processing can be delayed, as often happens in modern, complex computing, it can be useful to allow the client and the working thread to continue to work, e.g., on other processes, while awaiting a response. This is asynchronous request response. When implementing asynchronous request-response, methods can be included in the client that handles the asynchronous response or failures when it returns later on.

In accordance with an embodiment, the protocol framework, upon sending a request to one of the plurality of nodes, can attach a header to the request such that the header identifies the request. Once the request has been transmitted, and the thread closed (i.e., asynchronous request response), the header can remain with the request. Once the request has been processed, and a response is ready to be send, the protocol again can add/maintain a header to the response, such that once the response is received at the traffic director, it can route the response accordingly, for example, to the originating requester.

Figure 3:
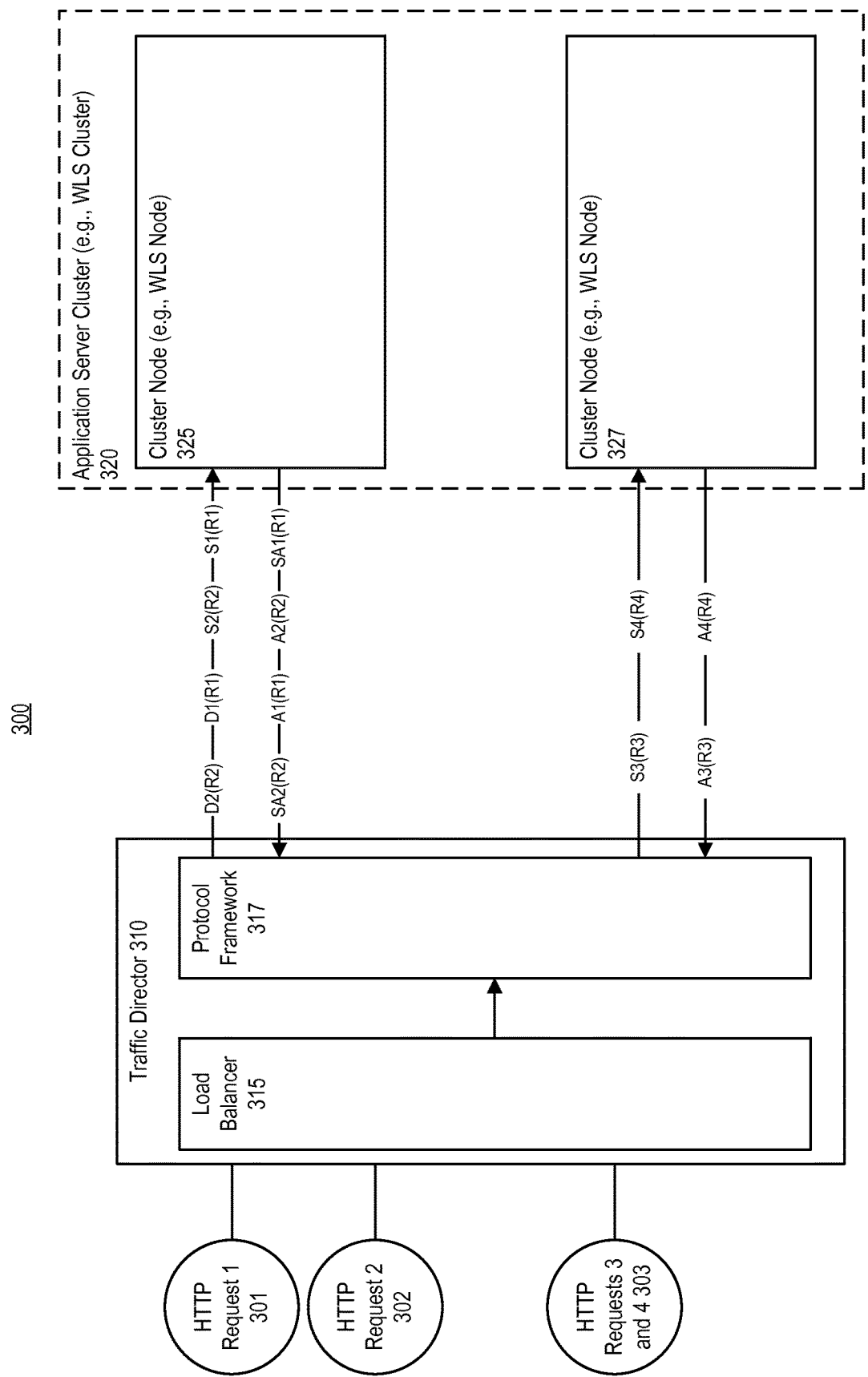
FIG. 3 shows an illustration of supporting asynchronous request response in a network environment, in accordance with an embodiment of the invention.

FIG. 3 shows an illustration of supporting asynchronous request response in a network environment, in accordance with an embodiment of the invention.

As shown in FIG. 3, a network environment 300 can include a traffic director (e.g., Oracle Traffic Director) 310, as well as an application server cluster (e.g., WebLogic Cluster) 320. The traffic director can include a load balancer 315, as well as a protocol framework 317, such as a Buzz protocol framework. The application server cluster can include a plurality of nodes, such as cluster node 325 and cluster node 327, both of which can be, in an embodiment, be a node in a WebLogic Server cluster.

In accordance with an embodiment, the traffic director can receive a plurality of requests, such as HTTP request 1 301, HTTP request 2 302, and HTTP requests 3 and 4 303. These request can be received from one or a plurality of requesting sources, such as clients or applications. The traffic director can load balance the request before passing the requests to protocol framework. The load balancer, which can be part of the traffic director, can distribute workloads across multiple computing resources, such as cluster nodes 325 and 327. An aim of load balancing is to optimize resource use, maximize throughput, minimize response time, and avoid overload of any single resource. Once the requests have been load balanced (e.g., directed to cluster node 325 or cluster node 327), the requests are passed through the protocol framework. Once at the protocol framework, depending on where the load balancer directed the request, the protocol framework can allow for asynchronous requests and responses, over, for example, InfiniBand, to the plurality of nodes within the application server cluster.

In accordance with an embodiment, the protocol framework, upon sending a request to one of the plurality of nodes, can attach a header to the request such that the header identifiers the request. Once the request has been transmitted, and the thread closed (i.e., asynchronous request response), the header can remain with the request. Once the request has been processed, and a response is ready to be send, the protocol again can add/maintain a header to the response, such that once the response is received at the traffic director, it can route the response accordingly, for example, to the originating requester.

In accordance with an embodiment, in addition to allowing for asynchronous request response over InfiniBand to the plurality of nodes within the application server cluster, the protocol framework can also break up large messages (i.e., messages over a predetermined size) into smaller, more manageable portions before transmission to the plurality of cluster nodes, each portion being associated with a header.

In accordance with an embodiment, the header attached to each portion of a large message that has been separated into the portions can perform dual purposes. In addition to identifying the overall identity of the larger message, each header can also identify a start and end of a message, as well as the sequence of each portion of the message. For example, a large request can be broken into four pieces before transmission to the plurality of nodes. The header of the first portion of the request indicates that the portion belongs to the request, and can identify the portion as the start of the request. The headers on the next two portions of the request can identify that the portions belong to the request, and also that the portions are the second and third, respectively, of the request. The final portion of the request can identify the portion as belonging to the request, and can identify the portion as the end of the request. As well, the protocol can send the different portions of the request in any arbitrary order.

In accordance with an embodiment, in addition to allowing for asynchronous requests and responses, the protocol framework can additionally allow for the interleaved transmission of multiple requests. For example, in a situation where two large requests are routed to the same cluster node in an application server cluster, the protocol framework can break both requests up into portions, each portion having a header that identifiers which request the portion belongs to as well as the sequential order of that portion within the associated request. The protocol can then allow for transmission of all portions of both requests, over InfiniBand, where the portions from each request are interleaved (i.e., mixed together in order). This can provide for more efficient use of threads and improved asynchronous requests and responses.

Referring now to FIG. 3, this shows an example of large requests and responses being broken into portions before transmission, and also shows the interleaving of the transmission of those portions. As depicted in FIG. 3, a number of requests can be received at the traffic director 310, for example, HTTP request 1, HTTP request 2, and HTTP requests 3 and 4. Once received at the traffic director, the load balancer can direct the requests to various cluster nodes in an application server cluster, such as cluster node 325 and cluster node 327. In the embodiment depicted in the figure, requests 1 and 2 are directed to cluster node 325, while requests 3 and 4 are directed to cluster node 327.

After being targeted, the requests then are passed through the protocol framework which breaks up the larger messages (e.g., requests 1 and 2), into smaller portions before transmission. For example, as shown in the figure, request 2 is broken into two portions, namely S2(R2) and D2(R2), and request 1 is likewise broken into two portions, namely D1(R1) and S1(R1). These portions can represent the start (S1 and S2) of the two requests, as well as the ending portions (D1 and D2). As shown in the figure, the portions of requests 1 and 2 are communicated to the cluster node in an interleaved manner. Once at the cluster node, which can include a protocol framework of its own (not shown), the portions of each request are then communicated to the respective targets, e.g., applications running in the cluster node 325. The thread that transmitted requests 1 and 2 is also made available to other network traffic (i.e., a block is not held awaiting a response).

Once responses to requests 1 and 2 are ready to be transmitted, they, like the requests, can be broken into smaller portions before transmission. For example, as shown in the figure, the response to request 2 (i.e., A2) is broken into two portions, namely SA2(R2) and A2(R2), and request 1 is likewise broken into two portions, namely SA1(R1) and A1(R1). These portions can represent the start (SA1 and SA2) of the two responses, as well as the ending portions (A1 and A2). As shown in the figure, the portions of responses 1 and 2 are communicated in an interleaved manner. Once received, the portions of each response are then communicated to the respective originators, e.g., requesting clients or applications. The thread that transmitted responses 1 and 2 is also made available to other network traffic.

Similarly, in accordance with an embodiment, requests 3 and 4, depicted in FIG. 3, are targeted to cluster node 327. After being targeted (i.e., load balanced) requests 3 and 4 then are passed through the protocol framework. Because requests 3 and 4 are not sufficiently large, these requests are not broken into smaller portions before transmission. As shown in the figure, requests 3 and 4, S3(R3) and S4(R4) respectively, are communicated to the cluster node 32. Once at the cluster node, the thread that transmitted requests 3 and 4 is made available to other network traffic (i.e., a block is not held awaiting a response).

Once responses to requests 3 and 4 are ready to be transmitted, a thread can be opened and the responses, A3(R3) and A4(R4), can be transmitted. Once received, the portions of each response are then communicated to the respective originators, e.g., requesting clients or applications. The thread that transmitted responses 3 and 4 is also made available to other network traffic.

Figure 4:
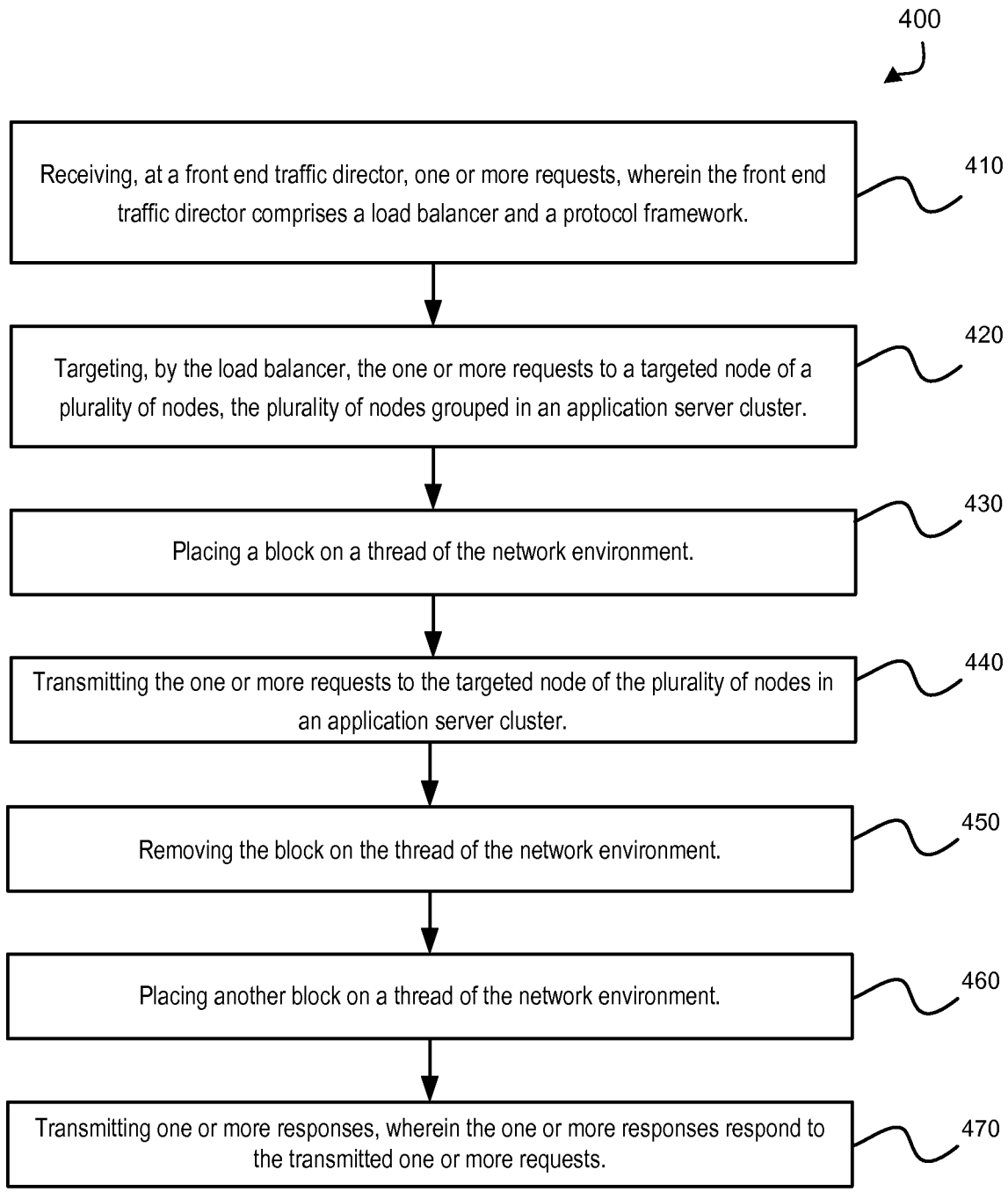
FIG. 4 shows an illustrative flowchart depicting a method for supporting asynchronous request/response in a network environment, in accordance with an embodiment.

FIG. 4 is an illustrative flowchart depicting a method for supporting asynchronous request/response in a network environment, in accordance with an embodiment. At step 410, the method can receive, at a front end traffic director, one or more requests, wherein the front end traffic director comprises a load balancer and a protocol framework. At step 420, the method can continue with targeting, by the load balancer, the one or more requests to a targeted node of a plurality of nodes, the plurality of nodes grouped in an application server cluster. At step 430, the method can place a block on a thread of the network environment. At step 440, the method can transmit the one or more requests to the targeted node of the plurality of nodes in an application server cluster. At step 450, the method continues with removing the block on the thread of the network environment. At step 460 and 470, the method can place another block on a thread of the network environment, and transmit one or more responses, wherein the one or more responses respond to the transmitted one or more requests.

The present disclosure, in accordance with an embodiment, allows for easier use of InfiniBand (rather than talking directly to InfiniBand hardware or low-level C-language drivers). While MessageBus can provide a higher-level way to exchange data in the form of Java ByteBuffers between computers, MB can be augmented with additional protocols in order to act as a transport for request/response protocols such as HTTP, IIOP and T3.

In accordance with an embodiment, this additional protocol on top of MB is called Buzz. Using Buzz, a load-balancer (e.g., Oracle Traffic Director) can direct HTTP requests and responses to nodes in a cluster over InifiniBand. Additionally, using Buzz, the nodes within the cluster can communicate among themselves using, for example, T3, for various tasks such as cluster replication and migration.

In accordance with an embodiment, in addition to tunneling HTTP requests and responses onto InfiniBand, Buzz can also allow for tunneling other communication protocols onto InfiniBand, including, but not limited to, T3, and IIOP (Internet Inter-ORB Protocol).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting asynchronous request/response in a network environment, comprising:
    receiving, at a front end traffic director, one or more requests, wherein the front end traffic director comprises a load balancer and a protocol framework;
    targeting, by the load balancer, the one or more requests to a targeted node of a plurality of nodes, the plurality of nodes grouped in an application server cluster;
    placing a block on a thread of the network environment, the block allowing only the one or more requests to utilize the thread;
    placing, by the protocol framework, a header indicating an originator of the one or more requests on the one or more requests;
    transmitting the one or more requests via the thread to the targeted node of the plurality of nodes in an application server cluster;
    removing the block on the thread of the network;
    placing another block on a second thread of the network environment, the another block allowing only one or more responses corresponding to the one or more requests to utilize the second thread; and
    transmitting the one or more responses via the second thread.

2. The method of claim 1, wherein the one or more requests share a same incoming protocol, the same incoming protocol being selected from the group consisting of HTTP, IIOP, and T3.

3. The method of claim 2, wherein the one or more requests are transmitted to the target node of the plurality of nodes in the application server cluster via InfiniBand protocol.

4. The method of claim 3, wherein the one or more responses are transmitted via InfiniBand protocol.

5. The method of claim 4, further comprising:
    tunneling, by a protocol framework, the one or more requests sharing the same incoming protocol to the InfiniBand protocol.

6. The method of claim 1, wherein transmitting the one or more requests to the targeted node of the plurality of nodes in the application server cluster comprises:
    comparing a size of each of one or more requests to a pre-selected upper limit request size;
    upon at least one of the one or more requests having a size greater than the pre-selected upper limit request size, breaking up the at least one of the one or more requests, by a protocol framework, in to a plurality of portions;
    attaching the header, by the protocol framework, to each of the plurality of portions, the header identifying the at least one of the one or more requests;
    transmitting each of the plurality of portions to the targeted node of the plurality of nodes in the application server cluster.

7. The method of claim 6, wherein each of the plurality of portions are transmitted to the targeted node of the plurality of nodes in an interleaved manner.

8. A system for supporting asynchronous request/response in a network environment, comprising:
one or more microprocessors; and
a processor, running on the one or more microprocessors, wherein the processor operates to perform steps comprising:
receiving, at a front end traffic director, one or more requests, wherein the front end traffic director comprises a load balancer and a protocol framework;
targeting, by the load balancer, the one or more requests to a targeted node of a plurality of nodes, the plurality of nodes grouped in an application server cluster;
placing, by the protocol framework, a header indicating an originator of the one or more requests on the one or more requests;
placing a block on a thread of the network environment, the block allowing only the one or more requests to utilize the thread;
transmitting the one or more requests via the thread to the targeted node of the plurality of nodes in an application server cluster;
removing the block on the thread of the network;
placing another block on a second thread of the network environment, the another block allowing only one or more responses corresponding to the one or more requests to utilize the second thread; and
transmitting the one or more responses via the second thread.

9. The system of claim 8, wherein the one or more requests share a same incoming protocol, the same incoming protocol being selected from the group consisting of HTTP, IIOP, and T3.

10. The system of claim 9, wherein the one or more requests are transmitted to the target node of the plurality of nodes in the application server cluster via InfiniBand protocol.

11. The system of claim 10, wherein the one or more responses are transmitted via InfiniBand protocol.

12. The system of claim 11, wherein the processor operates to perform steps further comprising:
tunneling, by a protocol framework, the one or more requests sharing the same incoming protocol to the InfiniBand protocol.

13. The system of claim 8, wherein the processor operates to perform the steps further comprising:
comparing a size of each of one or more requests to a pre-selected upper limit request size;
upon at least one of the one or more requests having a size greater than the pre-selected upper limit request size, breaking up the at least one of the one or more requests, by a protocol framework, in to a plurality of portions;
attaching the header, by the protocol framework, to each of the plurality of portions, the header identifying the at least one of the one or more requests;
transmitting each of the plurality of portions to the targeted node of the plurality of nodes in the application server cluster.

14. The system of claim 13, wherein each of the plurality of portions are transmitted to the targeted node of the plurality of nodes in an interleaved manner.

15. A non-transitory machine readable storage medium having instructions stored thereon for supporting asynchronous request/response in a network environment that when executed cause a system to perform steps comprising:
receiving, at a front end traffic director, one or more requests, wherein the front end traffic director comprises a load balancer and a protocol framework;
targeting, by the load balancer, the one or more requests to a targeted node of a plurality of nodes, the plurality of nodes grouped in an application server cluster;
placing, by the protocol framework, a header indicating an originator of the one or more requests on the one or more requests;
placing a block on a thread of the network environment, the block allowing only the one or more requests to utilize the thread;
transmitting the one or more requests via the thread to the targeted node of the plurality of nodes in an application server cluster;
removing the block on the thread of the network;
placing another block on a second thread of the network environment, the another block allowing only one or more responses corresponding to the one or more requests to utilize the second thread; and
transmitting the one or more responses via the second thread.

16. The non-transitory machine readable storage medium of claim 15, wherein the one or more requests share a same incoming protocol, the same incoming protocol being selected from the group consisting of HTTP, IIOP, and T3.

17. The non-transitory machine readable storage medium of claim 16, wherein the one or more requests are transmitted to the target node of the plurality of nodes in the application server cluster via InfiniBand protocol.

18. The non-transitory machine readable storage medium of claim 17, wherein the one or more responses are transmitted via InfiniBand protocol.

19. The non-transitory machine readable storage medium of claim 18, the steps further comprising:
tunneling, by a protocol framework, the one or more requests sharing the same incoming protocol to the InfiniBand protocol.

20. The non-transitory machine readable storage medium of claim 15, the steps further comprising:
comparing a size of each of one or more requests to a pre-selected upper limit request size;
upon at least one of the one or more requests having a size greater than the pre-selected upper limit request size, breaking up the at least one of the one or more requests, by a protocol framework, in to a plurality of portions;
attaching the header, by the protocol framework, to each of the plurality of portions, the header identifying the at least one of the one or more requests;
transmitting, in an interleaved manner, each of the plurality of portions to the targeted node of the plurality of nodes in the application server cluster.

* * * * *